US012265634B2

(12) United States Patent
Li

(10) Patent No.: US 12,265,634 B2
(45) Date of Patent: Apr. 1, 2025

(54) SECURITY MONITORING METHOD AND SYSTEM

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 261 days.

(21) Appl. No.: 17/973,469

(22) Filed: Oct. 25, 2022

(65) Prior Publication Data

US 2023/0049592 A1    Feb. 16, 2023

Related U.S. Application Data

(63) Continuation of application No. PCT/CN2021/077558, filed on Feb. 24, 2021.

(30) Foreign Application Priority Data

May 12, 2020  (CN) .......................... 202010396781.6

(51) Int. Cl.
*G06F 21/60*   (2013.01)
*B65G 43/00*   (2006.01)
(Continued)

(52) U.S. Cl.
CPC ........... *G06F 21/606* (2013.01); *B65G 43/00* (2013.01); *B65G 49/00* (2013.01); *G06F 21/6209* (2013.01); *B65G 2201/02* (2013.01)

(58) Field of Classification Search
CPC ............... G06F 21/606; G06F 21/6209; G06F 2221/2141; G06F 21/86; B65G 43/00;
(Continued)

(56) References Cited

U.S. PATENT DOCUMENTS 12,124,881 B2 * 10/2024 Talavera ................ G06Q 10/02
2001/0015691 A1   8/2001 Mellen et al.
(Continued)

FOREIGN PATENT DOCUMENTS

CN    102592341 A    7/2012
CN    103246855 A    8/2013
(Continued)

OTHER PUBLICATIONS

Reliable System to Lock/Locate Lost/Stolen Computer Hardware, Heidenreich et al, Aug. 2008 (Year: 2008).*
(Continued)

*Primary Examiner* — Jahangir Kabir

(57) ABSTRACT

A monitoring method and system for secure conveying are provided. In a process of conveying a confidential document or item by a secure conveying device, a conveying path of the secure conveying device can be monitored in real time, and a distance between the secure conveying device and an accompanying person can also be monitored in real time. In a case where the secure conveying device neither deviates from a predetermined path nor is separated from the accompanying person, safe opening of the secure conveying device is ensured through a combination of open time, an open position, and open authorization information, thereby ensuring security of the confidential document or item conveyed by the secure conveying device.

6 Claims, 2 Drawing Sheets

(51) Int. Cl.
*B65G 49/00* (2006.01)
*G06F 21/62* (2013.01)

(58) Field of Classification Search
CPC .............. B65G 49/00; B65G 2201/02; G06Q 10/0833; G06Q 10/08
USPC ........................................................ 726/26
See application file for complete search history.

(56) References Cited

U.S. PATENT DOCUMENTS

| 2004/0243452 A1 | 12/2004 | Barton et al. |
| 2014/0317005 A1 | 10/2014 | Balwani |
| 2019/0047513 A1 | 2/2019 | Fuke et al. |

FOREIGN PATENT DOCUMENTS

| CN | 105955144 A | 9/2016 |
| CN | 108009780 A | 5/2018 |
| CN | 109064675 A | 12/2018 |
| CN | 109388089 A | 2/2019 |
| CN | 208836177 U | 5/2019 |
| CN | 110189085 A | 8/2019 |
| CN | 110955215 A | 4/2020 |
| CN | 110991965 A | 4/2020 |
| CN | 111652542 A | 9/2020 |
| JP | H07016112 A | 1/1995 |
| JP | H11345374 A | 12/1999 |
| JP | 2003221955 A | 8/2003 |
| JP | 2014065557 A | 4/2014 |
| JP | 2019031874 A | 2/2019 |
| WO | 2018136599 A1 | 7/2018 |

OTHER PUBLICATIONS

Study of Out-Of-Hospital Access to HIS System: A Security Perspective, Chen et al, Jun. 2019 (Year: 2019).*
First Office Action from corresponding Chinese Application No. 202010396781.6, dated Mar. 10, 2023. English translation attached.
International Search Report dated May 25, 2021 in International Application No. PCT/CN2021/077558. English translation attached.
Extended European Search Report from corresponding European Application No. EP21804485.7, dated Aug. 30, 2023.
The Rejection Decision & Supplementary Search from corresponding Chinese Application No. 202010396781.6, dated Sep. 22, 2023. English translation attached.
Grant Notice dated Nov. 28, 2023 received in Japanese Patent Application No. 2022-568996. English translation attached.

* cited by examiner

SECURITY MONITORING METHOD AND SYSTEM

CROSS-REFERENCE TO RELATED APPLICATIONS

This application is a continuation of International Application No. PCT/CN2021/077558, filed on Feb. 24, 2021, which claims priority to Chinese Patent Application No. 202010396781.6 filed on May 12, 2020 by TENDYRON CORPORATION and entitled "SECURITY MONITORING METHOD AND SYSTEM", the entire content of which is incorporated herein by reference.

TECHNICAL FIELD

The present disclosure relates to the field of information security technologies, and more particularly, to a security monitoring method and system.

BACKGROUND

Nowadays, secure conveying of a confidential document or item can be carried out by a secure conveying device. After arriving at a designated place, the secure conveying device can be opened to take out the confidential document or item. However, for important confidential documents or items, they may be intercepted during conveying in an absence of proper monitoring measures, resulting in a leakage of the confidential documents or items. Also, insufficient secrecy of an existing secure conveying device can also lead to opening of the secure conveying device, resulting in the leakage of the confidential document or item. Therefore, it is an urgent issue to design a high-secrecy secure conveying device for conveying a confidential document or item and a monitoring system for monitoring the secure conveying device and the like to avoid the leakage of the confidential document or item.

SUMMARY

In an aspect of the present disclosure, a monitoring method for secure conveying is provided. The method includes: generating, by a server, setting information, which includes route information and open factor information, the route information being configured to indicate a path of a secure conveying device, and the open factor information being configured to indicate a condition for opening the secure conveying device; transmitting, by the server, the open factor information to the secure conveying device, the open factor information including a time factor, a position factor, and an authorization verification factor; receiving, by the secure conveying device, the open factor information; setting, by the secure conveying device, an open time based on the time factor; setting, by the secure conveying device, an open position based on the position factor; and setting, by the secure conveying device, an open authorization condition based on the authorization verification factor; positioning, by the server, the secure conveying device continuously; determining, by the server, continuously whether the path of the secure conveying device conforms to the route information; transmitting, by the server in response to the path of the secure conveying device not conforming to the route information, locking information to the secure conveying device; receiving, by the secure conveying device, the locking information; and locking, by the secure conveying device, the secure conveying device; determining, by the secure conveying device, continuously whether a distance between the secure conveying device and an accompanying person conforms to a predetermined range; and locking, by the secure conveying device in response to the distance not conforming to the predetermined range, the secure conveying device; receiving, by the secure conveying device, authorization information, in response to the server determining no occurrence of the path of the secure conveying device not conforming to the route information and the secure conveying device determining no occurrence of the distance between the secure conveying device and the accompanying person not conforming to the predetermined range; verifying, by the secure conveying device, the authorization information; determining, by the secure conveying device, whether position information of the secure conveying device at a time of receiving the authorization information conforms to the position factor; and determining, by the secure conveying device, whether the time of receiving the authorization information conforms to the time factor, the authorization information including at least two pieces of authorization sub-information; performing, by the secure conveying device, an open operation, after determining that the at least two pieces of authorization sub-information pass verification, the position information of the secure conveying device at the time of receiving the authorization information conforms to the position factor, and the time of receiving the authorization information conforms to the time factor; otherwise, locking, by the secure conveying device, the secure conveying device; and receiving, by the secure conveying device before performing the open operation, connection request information from a to-be-connected device; and determining, by the secure conveying device, record information, the record information including a time of receiving the connection request information, position information of the secure conveying device at the time of receiving the connection request information, and identification information of the to-be-connected device.

In another aspect of the present disclosure, a monitoring system for secure conveying is provided. The system includes a server and a secure conveying device. The server is configured to generate setting information, which includes route information and open factor information, and transmit the open factor information to the secure conveying device. The route information is configured to indicate a path of the secure conveying device. The open factor information is configured to indicate a condition for opening the secure conveying device. The open factor information includes a time factor, a position factor, and an authorization verification factor. The secure conveying device is configured to receive the open factor information, set an open time based on the time factor, set an open position based on the position factor, and set an open authorization condition based on the authorization verification factor. The server is further configured to position the secure conveying device continuously, determine continuously whether the path of the secure conveying device conforms to the route information, and transmit, in response to the path of the secure conveying device not conforming to the route information, locking information to the secure conveying device. The secure conveying device is further configured to receive the locking information, and lock the secure conveying device. The secure conveying device is further configured to determine continuously whether a distance between the secure conveying device and an accompanying person conforms to a predetermined range, and lock, in response to the distance not conforming to the predetermined range, the secure conveying device. The secure conveying device is further configured to receive, in response to the server determining no occurrence of the path of the secure conveying device not conforming to the route information and the secure conveying device determining no occurrence of the distance between the secure conveying device and the accompanying person not conforming to the predetermined range, authorization information, verify the authorization information, determine whether position information of the secure conveying device at a time of receiving the authorization information conforms to the position factor, and determine whether the time of receiving the authorization information conforms to the time factor. The authorization information includes at least two pieces of authorization sub-information. The secure conveying device is further configured to perform an open operation, after determining that the at least two pieces of authorization sub-information pass verification, the position information of the secure conveying device at the time of receiving the authorization information conforms to the position factor, and the time of receiving the authorization information conforms to the time factor; otherwise, lock the secure conveying device. The secure conveying device is further configured to receive, before performing the open operation, connection request information from a to-be-connected device, and determine record information. The record information includes a time of receiving the connection request information, position information of the secure conveying device at the time of receiving the connection request information, and identification information of the to-be-connected device.

DESCRIPTION OF EMBODIMENTS

Embodiments of the present disclosure will be described in detail below in combination with accompanying drawings.

Figure 1:
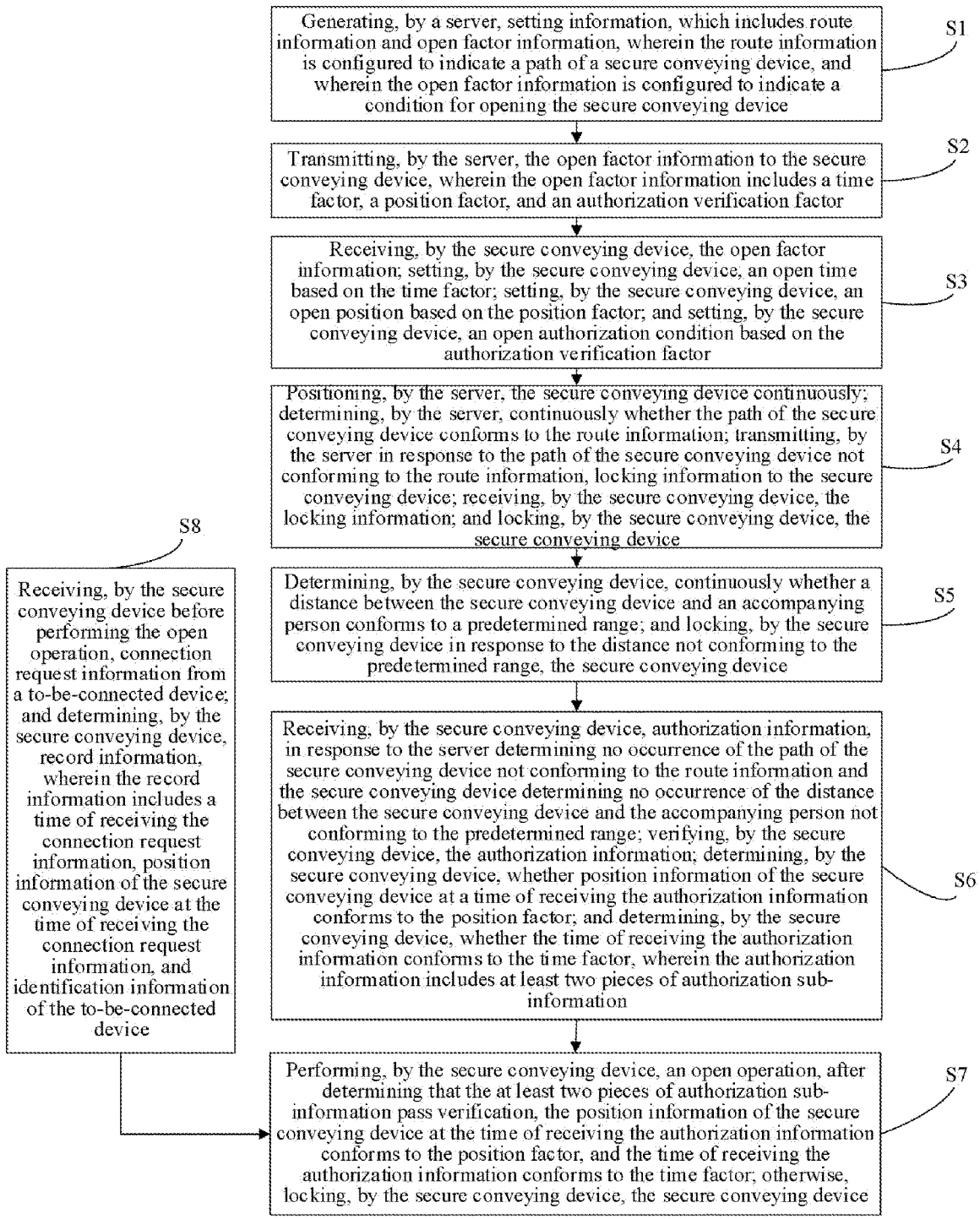
FIG. 1 is a flowchart illustrating a monitoring method for secure conveying according to an embodiment of the present disclosure.

FIG. 1 illustrates a flowchart of a monitoring method for secure conveying according to an embodiment of the present disclosure. Referring to FIG. 1, the monitoring method for secure conveying provided by the embodiment of the present disclosure includes actions S1 to S8.

At S1, a server generates setting information. The setting information includes route information and open factor information. The route information is configured to indicate a path of a secure conveying device. The open factor information is configured to indicate a condition for opening the secure conveying device.

Specifically, the server and the secure conveying device may be connected with each other in a wired manner, e.g. via a Universal Serial Bus (USB), a serial port, etc., or in a wireless manner via, e.g., Near Field Communication (NFC), Bluetooth, Wireless Fidelity (WIFI), 4-th Generation Mobile Communication Technology (4G), 5-th Generation Mobile Communication Technology (5G), etc. The present disclosure is not limited to any of these examples.

The secure conveying device may be set by the server before conveying a confidential document or item, thereby making the secure conveying device have a higher secrecy level. In addition, since the secure conveying device needs to be set each time before conveying, and the setting for the secure conveying device is different each time, cracking of the secure conveying device can be avoided.

In order to ensure security of the setting of the secure conveying device, the server may set the secure conveying device after two-way authentication with the secure conveying device. For example, mutual certificate authentication is performed between the server and the secure conveying device to establish a secure connection channel, through which the server sets the secure conveying device. In addition, the secure conveying device may also save a whitelist of servers that may set the secure conveying device. Only a server in the whitelist may configure the secure conveying device.

Specific configuration information generated by the server may include the route information that allows for real-time monitoring of a conveying path of the secure conveying device.

Also, the server further generates the open factor information for opening the secure conveying device after the secure conveying device reaches a destination. In this way, it is ensured that an open operation can be performed only when the secure conveying device meets an open condition, thereby ensuring security of the document or item conveyed by the secure conveying device.

At S2, the server transmits the open factor information to the secure conveying device. The open factor information includes a time factor, a position factor, and an authorization verification factor.

Specifically, the condition for opening the secure conveying device includes the time factor, the position factor, and the authorization verification factor.

The time factor indicates a time when the secure conveying device is opened. The time should be within a predetermined range, such as from a first yyyy-MM-dd-HH-mm to a second yyyy-MM-dd-HH-mm, or more accurately from a first yyyy-MM-dd-HH-mm-ss to a second yyyy-MM-dd-HH-mm-ss. The security for opening the secure conveying device increases as the range of the time factor decreases.

The position factor indicates a position where the secure conveying device is opened. Such position information may be within a predetermined position range. For example, a street name and a room number may be used, or latitude and longitude may be used for positioning. The security for opening the secure conveying device increases as accuracy of the position information increases.

The authorization verification factor indicates authorization information for opening the secure conveying device, e.g., a password, a dynamic password, biometric feature, or a digital signature. It should be noted that the authorization verification factor in the present disclosure includes at least two verification subfactors, which may be the same type of subfactors, such as at least two passwords, at least two rule-generated dynamic passwords, at least two pieces of biometric feature information, or at least two digital signatures. Of course, the at least two verification subfactors may also be different types of verification subfactors, namely different types of authorization sub-information, e.g., one of the at least two verification subfactors being the dynamic password while the other one being the biometric feature information. The at least two verification subfactors are not limited in the present disclosure, and any verification subfactors shall fall within the protection scope of the present disclosure as long as they are capable of authorizing the secure conveying device to open.

At S3, the secure conveying device receives the open factor information, sets an open time based on the time factor, sets an open position based on the position factor, and sets an open authorization condition based on the authorization verification factor.

Specifically, after receiving the open factor information, the secure conveying device may set based on the open factor information.

Setting the open time based on the time factor may be setting a time when the secure conveying device is opened based on the time factor, e.g., from a first yyyy-MM-dd-HH-mm to a second yyyy-MM-dd-HH-mm.

Setting the open position based on the position factor may be setting position information where the secure conveying device is opened based on the position factor, e.g., No. xx, Road xx, xx Street.

Setting the open authorization condition based on the authorization verification factor may be setting an open condition for opening the secure conveying device based on the authorization verification factor, e.g., one or a combination of the password, the dynamic password, the biometric feature, the digital signature, etc., to ensure safe opening of the secure conveying device.

At S4, the server positions the secure conveying device continuously, determines continuously whether the path of the secure conveying device conforms to the route information, and transmits, in response to the path of the secure conveying device not conforming to the route information, locking information to the secure conveying device; and the secure conveying device receives the locking information, and locks the secure conveying device.

Specifically, during the setting action, the route information may be saved on the server. When the secure conveying device conveys a confidential document or item, the server obtains a conveying path of the secure conveying device by real-time positioning, to continuously determine whether the path of the secure conveying device conforms to the route information. The server positions the secure conveying device and monitors the conveying path of the secure conveying device, thereby preventing the secure conveying device from deviating from a predetermined path in a conveying process and reducing a possibility of the secure conveying device being hijacked and cracked.

As an optional alternative scheme, the server may also transmit the route information to the secure conveying device. The secure conveying device receives the route information and positions itself in real time to determine whether the path of the secure conveying device conforms to the route information, and locks, in response to the path of the secure conveying device not conforming to the route information, the secure conveying device. In this way, the secure conveying device can perform path determination by itself to prevent the secure conveying device from deviating from the predetermined path in the conveying process and reduce the possibility of being hijacked and cracked.

As an optional implementation of the embodiment of the present disclosure, the monitoring method for secure conveying according to the embodiment of the present disclosure further includes, subsequent to locking the secure conveying device: generating prompt information, and prompting with the prompt information. As an optional implementation of the present disclosure, generating the prompt information and prompting with the prompt information is carried out by the server. That is, after transmitting the locking information, the server may also generate the prompt information to prompt a monitoring person that the secure conveying device deviates from the predetermined path. For example, prompting may be done by at least one of sounding an audible alarm, issuing a light alarm, making an alarm call, etc. As another optional implementation of the present disclosure, generating the prompt information and prompting with the prompt information is carried out by the secure conveying device. That is, after locking the secure conveying device, the secure conveying device generates the prompt information to prompt the monitoring person that the secure conveying device deviates from the predetermined path. For example, prompting may be done by at least one of: transmitting the prompt information to the server to sound the audible alarm, issue the light alarm, make the alarm call, etc.; or the secure conveying device itself sounding the audible alarm, issuing the light alarm, making the alarm call, etc. The present disclosure is not limited to any of these examples.

At S5, the secure conveying device determines continuously whether a distance between the secure conveying device and an accompanying person conforms to a predetermined range, and locks, in response to the distance not conforming to the predetermined range, the secure conveying device.

Specifically, the secure conveying device also monitors the distance between itself and the accompanying person. For example, when the secure conveying device monitors that it is out of the predetermined range from the accompanying person, the secure conveying device locks itself to ensure security of the confidential document or item conveyed by the secure conveying device.

As an optional implementation of the embodiment of the present disclosure, the secure conveying device and the accompanying person are each configured with a Bluetooth module, by which it is determined whether the distance between the secure conveying device and the accompanying person conforms to the predetermined range; or the secure conveying device monitors a field of a human body and determines, in response to being out of the predetermined range from the field of the human body, that the distance does not conform to the predetermined range; or the secure conveying device monitors a state of an interface by means of a wired connection to determine whether the distance conforms to the predetermined range. The present disclosure is not limited to any of these examples.

As an optional implementation of the embodiment of the present disclosure, the monitoring method for secure conveying according to the embodiment of the present disclosure further includes, subsequent to locking the secure conveying device: generating prompt information, and prompting with the prompt information. As an optional implementation of the present disclosure, generating the prompt information and prompting with the prompt information is carried out the server. That is, the server receives the prompt information transmitted by the secure conveying device to prompt the monitoring person that the secure conveying device is separated from the accompanying person. For example, prompting may be done by at least one of sounding an audible alarm, issuing a light alarm, making an alarm call, etc. As another optional implementation of the present disclosure, generating the prompt information and prompting with the prompt information is carried out by the secure conveying device. That is, after locking the secure conveying device, the secure conveying device generates the prompt information to prompt the monitoring person that the secure conveying device is separated from the accompanying person. For example, prompting may be done by at least one of: transmitting the prompt information to the server to sound the audible alarm, issue the light alarm, make the alarm call, etc.; or the secure conveying device itself sounding the audible alarm, issuing the light alarm, making the alarm call, etc. The present disclosure is not limited to any of these examples.

At S6, the secure conveying device receives authorization information, in response to the server determining no occurrence of the path of the secure conveying device not conforming to the route information and the secure conveying device determining no occurrence of the distance between the secure conveying device and the accompanying person not conforming to the predetermined range; and the secure conveying device verifies the authorization information, determines whether position information of the secure conveying device at a time of receiving the authorization information conforms to the position factor, and determines whether the time of receiving the authorization information conforms to the time factor. The authorization information includes at least two pieces of authorization sub-information.

Specifically, only when the server determines no occurrence of the path of the secure conveying device not conforming to the route information and the secure conveying device determines no occurrence of the distance between the secure conveying device and the accompanying person not conforming to the predetermined range can it be indicated that no risk occurs in the conveying process. In this case, when the secure conveying device reaches the destination, the open operation may be performed on the secure conveying device based on an agreed time and the authorization information to take out the confidential document or item conveyed by the secure conveying device.

At S7, the secure conveying device performs an open operation, after determining that the at least two pieces of authorization sub-information pass verification, the position information of the secure conveying device at the time of receiving the authorization information conforms to the position factor, and the time of receiving the authorization information conforms to the time factor; otherwise, the secure conveying device locks the secure conveying device.

Specifically, the secure conveying device performs the open operation, only after determining that the at least two pieces of authorization sub-information pass verification, the position information of the secure conveying device at the time of receiving the authorization information conforms to the position factor, and the time of receiving the authorization information conforms to the time factor. Such a manner ensures a secure taking out of the conveyed confidential document or item.

Otherwise, once any one of the above conditions is not satisfied, the secure conveying device locks the secure conveying device to ensure the security of the conveyed confidential document or item.

As an optional implementation of the embodiment of the present disclosure, the monitoring method for secure conveying according to the embodiment of the present disclosure further includes, subsequent to locking the secure conveying device: generating prompt information, and prompting with the prompt information. As an optional implementation of the present disclosure, generating the prompt information and prompting with the prompt information is carried out by the server. That is, the server receives the prompt information transmitted by the secure conveying device to prompt the monitoring person that the secure conveying device fails to be opened. For example, prompting may be done by at least one of sounding an audible alarm, issuing a light alarm, making an alarm call, etc. As another optional implementation of the present disclosure, generating the prompt information and prompting with the prompt information is carried out by the secure conveying device. That is, after locking the secure conveying device, the secure conveying device generates the prompt information to prompt the monitoring person that the secure conveying device fails to be opened. For example, prompting may be done by at least one of: transmitting the prompt information to the server to sound the audible alarm, issue the light alarm, make the alarm call, etc.; or the secure conveying device itself sounding the audible alarm, issuing the light alarm, making the alarm call, etc. The present disclosure is not limited to any of these examples.

At S8, the secure conveying device receives, before performing the open operation, connection request information from a to-be-connected device and determines record information. Here, the record information includes a time of receiving the connection request information, position information of the secure conveying device at the time of receiving the connection request information, and identification information of the to-be-connected device.

Specifically, in a process of conveying the confidential document or item by the secure conveying device, once the secure conveying device receives a connection request, it is determined that a spying action occurs. In this case, a time when and a position where the connection request information occurs and an identifier of the to-be-connected device are recorded to form risk data for further secure monitoring of the conveying process of the secure conveying device.

As an optional implementation of the embodiment of the present disclosure, the monitoring method for secure conveying according to the embodiment of the present disclosure further includes: determining whether the connection request information is a legitimate connection request, and saving, in response to the connection request information being not the legitimate connection request, the record information. For example, when the secure conveying device receives the connection request information and determines that the to-be-connected device transmitting the connection request information is not in the whitelist, it is determined that the connection request information is not the legitimate connection request. For example, it is determined that the spying action occurs. Therefore, the record information is saved for subsequent tracing of the current conveying of the secure conveying device.

It can be seen that, with the monitoring method for secure conveying according to the embodiment of the present disclosure, in the process of conveying the confidential document or item by the secure conveying device, the conveying path of the secure conveying device can be monitored in real time, and the distance between the secure conveying device and the accompanying person can also be monitored in real time. In a case where the secure conveying device neither deviates from the predetermined path nor is separated from the accompanying person, safe opening of the secure conveying device is ensured through a combination of the open time, the open position, and the open authorization information, thereby ensuring the security of the confidential document or item conveyed by the secure conveying device.

Figure 2:
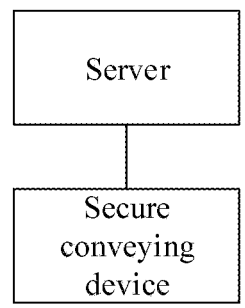
FIG. 2 is a schematic diagram showing a structure of a monitoring system for secure conveying according to an embodiment of the present disclosure.

FIG. 2 illustrates a schematic diagram showing a structure of a monitoring system for secure conveying according to an embodiment of the present disclosure. Only a brief description of the structure of the monitoring system for secure conveying according to the embodiment of the present disclosure is given below. For matters not described in the following description, reference may be made to the above description of the monitoring method for secure conveying, and thus details thereof will be omitted here. Referring to FIG. 2, the monitoring system for secure conveying according to the embodiment of the present disclosure includes a server and a safe conveying device.

The server is configured to generate setting information, which includes route information and open factor information, and transmit the open factor information to the secure conveying device. The route information is configured to indicate a path of the secure conveying device. The open factor information is configured to indicate a condition for opening the secure conveying device. The open factor information includes a time factor, a position factor, and an authorization verification factor. The secure conveying device is configured to receive the open factor information, set an open time based on the time factor, set an open position based on the position factor, and set an open authorization condition based on the authorization verification factor. The server is further configured to position the secure conveying device continuously, determine continuously whether the path of the secure conveying device conforms to the route information, and transmit, in response to the path of the secure conveying device not conforming to the route information, locking information to the secure conveying device. The secure conveying device is further configured to receive the locking information, and lock the secure conveying device. The secure conveying device is further configured to determine continuously whether a distance between the secure conveying device and an accompanying person conforms to a predetermined range, and lock, in response to the distance not conforming to the predetermined range, the secure conveying device. The secure conveying device is further configured to receive, in response to the server determining no occurrence of the path of the secure conveying device not conforming to the route information and the secure conveying device determining no occurrence of the distance between the secure conveying device and the accompanying person not conforming to the predetermined range, authorization information, verify the authorization information, determine whether position information of the secure conveying device at a time of receiving the authorization information conforms to the position factor, and determine whether the time of receiving the authorization information conforms to the time factor. The authorization information includes at least two pieces of authorization sub-information. The secure conveying device is further configured to perform an open operation, after determining that the at least two pieces of authorization sub-information pass verification, the position information of the secure conveying device at the time of receiving the authorization information conforms to the position factor, and the time of receiving the authorization information conforms to the time factor; otherwise, lock the secure conveying device. The secure conveying device is further configured to receive, before performing the open operation, connection request information from a to-be-connected device, and determine record information. The record information includes a time of receiving the connection request information, position information of the secure conveying device at the time of receiving the connection request information, and identification information of the to-be-connected device.

It can be seen that with the monitoring system for secure conveying according to the embodiment of the present disclosure, in the process of conveying the confidential document or item by the secure conveying device, the conveying path of the secure conveying device can be monitored in real time, and the distance between the secure conveying device and the accompanying person can also be monitored in real time. In a case where the secure conveying device neither deviates from the predetermined path nor is separated from the accompanying person, safe opening of the secure conveying device is ensured through a combination of the open time, the open position, and the open authorization information, thereby ensuring the security of the confidential document or item conveyed by the secure conveying device.

As an optional implementation of the embodiment of the present disclosure, the secure conveying device is further configured to determine whether the connection request information is a legitimate connection request, and save, in response to the connection request information being not the legitimate connection request, the record information. Therefore, traceability of the conveying process of the secure conveying device can be realized.

As an optional implementation of the embodiment of the present disclosure, after the secure conveying device locks the secure conveying device, the server is further configured to generate prompt information and prompt with the prompt information; or the secure conveying device is further configured to generate prompt information and prompt with the prompt information. Therefore, the monitoring person can be prompted of improper conveying of the secure conveying device.

Although embodiments of the present disclosure have been illustrated and described, it is conceivable that the embodiments described above are illustrative only and cannot be construed as limiting the present disclosure. For those skilled in the art, various changes, modifications, replacements, and variations can be made to these embodiments without departing from the principles and spirit of the present disclosure. The scope of the present disclosure shall be defined by the claims as appended and their equivalents.

What is claimed is:

1. A monitoring method for secure conveying, comprising:
   generating, by a server, setting information, which comprises route information and open factor information, wherein the route information is configured to indicate a path of a secure conveying device, and wherein the open factor information is configured to indicate a condition for opening the secure conveying device;
   transmitting, by the server, the open factor information to the secure conveying device, wherein the open factor information comprises a time factor, a position factor, and an authorization verification factor;
   receiving, by the secure conveying device, the open factor information; setting, by the secure conveying device, an open time based on the time factor; setting, by the secure conveying device, an open position based on the position factor; and setting, by the secure conveying device, an open authorization condition based on the authorization verification factor;
   positioning, by the server, the secure conveying device continuously; determining, by the server, continuously whether the path of the secure conveying device conforms to the route information; transmitting, by the server in response to the path of the secure conveying device not conforming to the route information, locking information to the secure conveying device; receiving, by the secure conveying device, the locking information; and locking, by the secure conveying device, the secure conveying device;
   determining, by the secure conveying device, continuously whether a distance between the secure conveying device and an accompanying person conforms to a predetermined range; and locking, by the secure conveying device in response to the distance not conforming to the predetermined range, the secure conveying device;

receiving, by the secure conveying device, authorization information, in response to the server determining no occurrence of the path of the secure conveying device not conforming to the route information and the secure conveying device determining no occurrence of the distance between the secure conveying device and the accompanying person not conforming to the predetermined range; verifying, by the secure conveying device, the authorization information; determining, by the secure conveying device, whether position information of the secure conveying device at a time of receiving the authorization information conforms to the position factor; and determining, by the secure conveying device, whether the time of receiving the authorization information conforms to the time factor, wherein the authorization information comprises at least two pieces of authorization sub-information;

performing, by the secure conveying device, an open operation, after determining that the at least two pieces of authorization sub-information pass verification, the position information of the secure conveying device at the time of receiving the authorization information conforms to the position factor, and the time of receiving the authorization information conforms to the time factor; otherwise, locking, by the secure conveying device, the secure conveying device; and receiving, by the secure conveying device before performing the open operation, connection request information from a to-be-connected device; and determining, by the secure conveying device, record information, wherein the record information comprises a time of receiving the connection request information, position information of the secure conveying device at the time of receiving the connection request information, and identification information of the to-be-connected device.

2. The method according to claim 1, further comprising: determining whether the connection request information is a legitimate connection request, and saving, in response to the connection request information being not the legitimate connection request, the record information.

3. The method according to claim 1, further comprising, subsequent to said locking the secure conveying device: generating prompt information, and prompting with the prompt information.

4. A monitoring system for secure conveying, comprising: a server and a secure conveying device which has an interior space for housing a confidential document or item, wherein the server is configured to generate setting information, which comprises route information and open factor information, and transmit the open factor information to the secure conveying device, wherein: the route information is configured to indicate a path of the secure conveying device, the open factor information is configured to indicate a condition for opening the secure conveying device, and the open factor information comprises a time factor, a position factor, and an authorization verification factor;

the secure conveying device is configured to receive the open factor information, set an open time based on the time factor, set an open position based on the position factor, and set an open authorization condition based on the authorization verification factor;

the server is further configured to position the secure conveying device continuously, determine continuously whether the path of the secure conveying device conforms to the route information, and transmit, in response to the path of the secure conveying device not conforming to the route information, locking information to the secure conveying device;

the secure conveying device is further configured to receive the locking information, and lock the secure conveying device;

the secure conveying device is further configured to determine continuously whether a distance between the secure conveying device and an accompanying person conforms to a predetermined range, and lock, in response to the distance not conforming to the predetermined range, the secure conveying device;

the secure conveying device is further configured to receive, in response to the server determining no occurrence of the path of the secure conveying device not conforming to the route information and the secure conveying device determining no occurrence of the distance between the secure conveying device and the accompanying person not conforming to the predetermined range, authorization information, verify the authorization information, determine whether position information of the secure conveying device at a time of receiving the authorization information conforms to the position factor, and determine whether the time of receiving the authorization information conforms to the time factor, wherein the authorization information comprises at least two pieces of authorization sub-information;

the secure conveying device is further configured to perform an open operation, after determining that the at least two pieces of authorization sub-information pass verification, the position information of the secure conveying device at the time of receiving the authorization information conforms to the position factor, and the time of receiving the authorization information conforms to the time factor; otherwise, lock the secure conveying device; and the secure conveying device is further configured to receive, before performing the open operation, connection request information from a to-be-connected device, and determine record information, wherein the record information comprises a time of receiving the connection request information, position information of the secure conveying device at the time of receiving the connection request information, and identification information of the to-be-connected device.

5. The system according to claim 4, wherein the secure conveying device is further configured to:

determine whether the connection request information is a legitimate connection request, and save, in response to the connection request information being not the legitimate connection request, the record information.

6. The system according to claim 4, wherein after the secure conveying device locks the secure conveying device, the server is further configured to generate prompt information and prompt with the prompt information; or the secure conveying device is further configured to generate prompt information and prompt with the prompt information.

* * * * *